US000001010H

United States Statutory Invention Registration [19]

[11] Reg. Number: H1010

Kasten et al. [43] Published: Jan. 7, 1992

[54] RECOIL MECHANISMS

[75] Inventors: Robert E. Kasten, Moline; Robert J. Radkiewicz, East Moline, both of Ill.

[73] Assignee: The United States of America as represented by the Secretary of the Army, Washington, D.C.

[21] Appl. No.: 731,212

[22] Filed: Jul. 15, 1991

[51] Int. Cl.[5] ..... F41A 25/04

[52] U.S. Cl. ..... 89/43.01

*Primary Examiner*—Stephen C. Bentley

*Attorney, Agent, or Firm*—Anthony T. Lane; Edward Goldberg; Michael Sachs

[57] ABSTRACT

The invention provides an improvement in a conventional recoil system comprising a piston-cylinder arrangement, wherein a piston driven by recoil energy forces hydraulic fluid out of the cylinder through an orifice to dissipate recoil force. The invention provides an additional flowpath for hydraulic fluid, which contains a servo valve for controlling the pressure in the cylinder so that the desired recoil peak pressure/time curve can be achieved for any firing impulse. The invention also includes sensors for measuring hydraulic fluid pressure and the initial velocity of the recoiling parts imparted by the firing impulse, and a controller means including a microprocessor for calculating or determining the desired peak pressure based on this initial velocity and available recoil distance and transducers for measuring any variation of pressure from the desired peak pressure and applying an appropriate voltage to the servo valve to control the pressure and achieve the desired peak pressure during the recoil cycle.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RECOIL MECHANISMS

GOVERNMENT INTEREST

The invention described herein may be manufactured, used and licensed by or for the Government for governmental purposes without payment to us of any royalty thereon.

BACKGROUND OF THE INVENTION

Recoil devices dissipate the energy of gunfire at a controlled rate so as to minimize the recoil force transferred to the gun carriage without exceeding the available length of recoil. In a simple hydraulic recoil device the recoiling mass is given an initial velocity by the firing impulse. The recoiling mass drives a piston in a hydraulic cylinder against the hydraulic fluid causing the fluid to flow out of the cylinder through an orifice area, as shown in FIG. 1. The orifice ,area is a function of the position of the recoiling mass and the functional relationship is chosen to transfer the desired force as a function of time to the carriage.

The desired force/time relationship is usually trapezoidal in shape, as shown by the dashed line in FIG. 2, wherein the force rises rapidly to a maximum and maintains this maximum through the recoil cycle, and then drops quickly to a lower pressure which is maintained through the counter-recoil cycle. The pressure in the hydraulic cylinder follows the same time response as this force. As shown by the trapezoidal force/time curve, the peak force transmitted to the carriage is minimum when the recoil force is constant over the available recoil distance, and is the usual objective of the recoil mechanism designer. However, military howitzers fire a variety of projectiles using a number of different propellant charges (zone charges). Therefore the recoil mechanism must function satisfactorily for a wide range of firing impulses and elevation angles.

The conventional recoil mechanism thus described is an open loop control system, wherein the pressure in the hydraulic cylinder is controlled by an orifice which is designed using a priori knowledge of the system response. However, the problems associated with this open loop control system are common to any open loop controller in that the system does not account for variation in the input (impulse), operating conditions (elevation angle), environment (ambient temperature) and plant (result of many firings), and the system performance is degraded.

Modern recoil mechanisms are designed to attain the desired pressure or force characteristics under the most severe conditions, namely maximum impulse. However, variations in input result from the use of both lower impulse rounds (lighter rounds or lower zone charges) and higher impulse rounds, the latter being often introduced after a system is fielded. Also, while systems have been designed that will achieve the desired response for two recoil lengths, one for low elevation angles (long recoil) and one for high elevation angles (short recoil), the peak force is of course larger in the case of the short recoil.

Accordingly, it would be desirable to provide a control system which can adapt to different firing charges. S. M. Wu and A. N. Madiwale have proposed a mathematical model for a modified hydropneumatic recoil mechanism, wherein a separate control law is designed for each firing charge and the control law corresponding to the charge being fired is selected from this predesigned set. This control scheme can be implemented by the addition of servo valves operating in tandem with the variable area orifice of a conventional recoil mechanism in which the feedback gains for the servo valve can be selected from a predesigned set by identifying the charge being fired by sensing signals such as acceleration with the help of a microprocessor (Technical Report No. R-TR-77-024, "Optimal Control of Active Recoil Mechanism", February 1977, Prepared for Engineering Directorate & General Thomas J. Rodman Laboratory, Rock Island Arsenal, Rock Island, Ill.). See also Proceedings of 2nd Annual U.S. Army Symposium on Gun Dynamics, Publication ARLCB-SP-78013,19-22 September 1978, and also ASME Publication 78-WA/DSC-12, December 1978, "Optimal Adaptive Control of Active Recoil Mechanisms", A. N. Madiwale, R. E. Kasten, S. M. Wu and R. J. Radkiewicz.

BRIEF SUMMARY OF THE INVENTION

The novel closed loop recoil system of the present invention provides an additional hydraulic fluid flowpath to a conventional control orifice of a piston-cylinder recoil absorption mechanism. This additional flowpath contains a servo valve connected to low pressure and high pressure hydraulic fluid reservoirs. The system also contains sensors (transducers) for measuring system status including hydraulic pressure and initial velocity imparted to the recoiling parts by the round impulse, means for calculating or determining a reference or desired peak hydraulic pressure based on this initial velocity and available recoil distance, and transducer means for sensing any variation of hydraulic pressure from the reference pressure during the recoil cycle and applying an appropriate voltage to the servo valve to port hydraulic fluid, as required, to control the pressure in the cylinder. In this manner the closed loop system allows the recoil pressure/time curve to be shaped for any firing charge and thereby achieve a desired trapezoidal pressure/time characteristic for each round fired over a range of firing charges and operating conditions.

For a better understanding of the present invention reference is made to the following description taken in connection with the accompanying drawings.

DESIRED DESCRIPTION OF THE INVENTION

Figure 1:
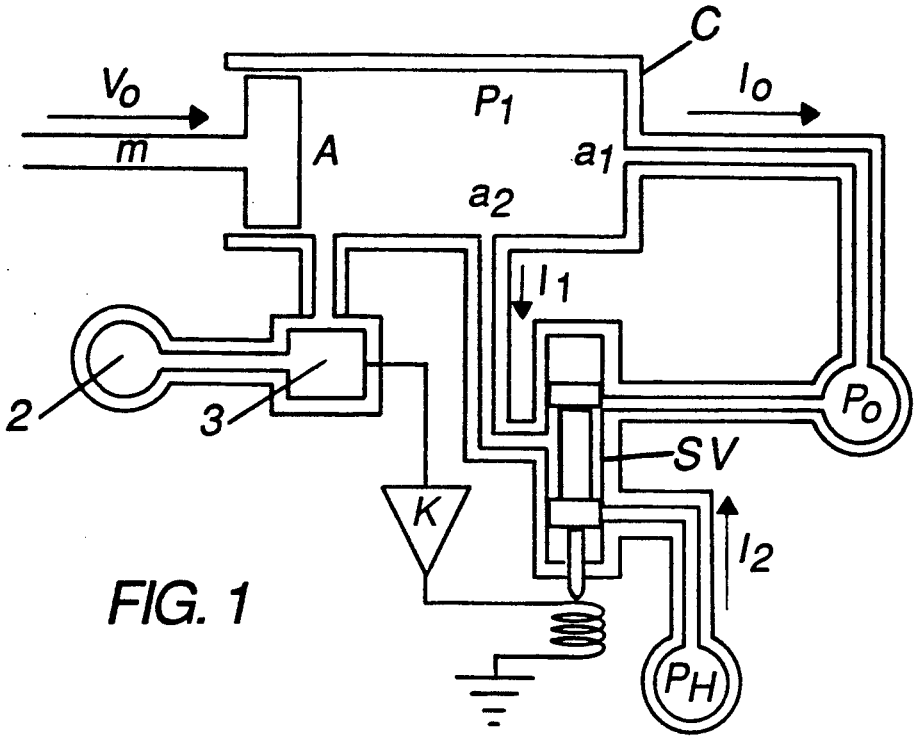
FIG. 1 shows a schematic drawing of a closed loop recoil mechanism of the present invention.

The closed loop recoil system of the present invention is shown in FIG. 1, wherein the recoiling mass (not shown) drives a piston A in a hydraulic cylinder C filled with a hydraulic fluid under pressure $P_1$. As in conventional designs, the cylinder contains an orifice "a", connected to a conduit providing a flowpath $I_0$ to a low pressure hydraulic fluid supply $P_0$.

In accordance with the present invention the cylinder C is provided with a second orifice "a", connected to a conduit, which provides a parallel hydraulic fluid flowpath I, to the low pressure reservoir $P_0$, thereby forming a closed loop system. The conduit providing flowpath $I_1$, contains a servo valve SV, which is also connected to a high pressure hydraulic fluid reservoir $P_H$ by a conduit providing flowpath $I_2$. The servo valve is so constructed as to control the amount of hydraulic fluid flow into or out of the cylinder through orifice $a_2$. The closed loop system includes transducers (PRESS. SENSOR) for measuring system status including the initial velocity imparted to the recoiling parts by the round being fired and the hydraulic pressure in the cylinder, as well as a controller means, which processes the signals/data from the sensors and utilizes them to generate a command to the servo valve. More specifically, the controller means calculates a desired peak or reference pressure $P_{ref}$ based on this initial velocity and the available recoil distance in known manner (as is known, the pressure/time curves for each firing charge can be calculated mathematically or determined experimentally), and by means of transducers would sense any variation of the hydraulic pressure from the reference pressure during the recoil cycle and then apply an appropriate control voltage via an amplifier K to the servo valve SV, which would port hydraulic fluid via orifice $a_2$ to achieve the required pressure in the cylinder. In this manner the closed loop system, operating in parallel to a conventional orifice (open loop) design, can achieve a trapezoidal pressure/time curve for any round fired. In normal operations, the conventional orifice design would minimize the flow requirements through the servo valve and in the event of failure of the servo valve or controller would function as a fail-safe back up.

Figure 2:
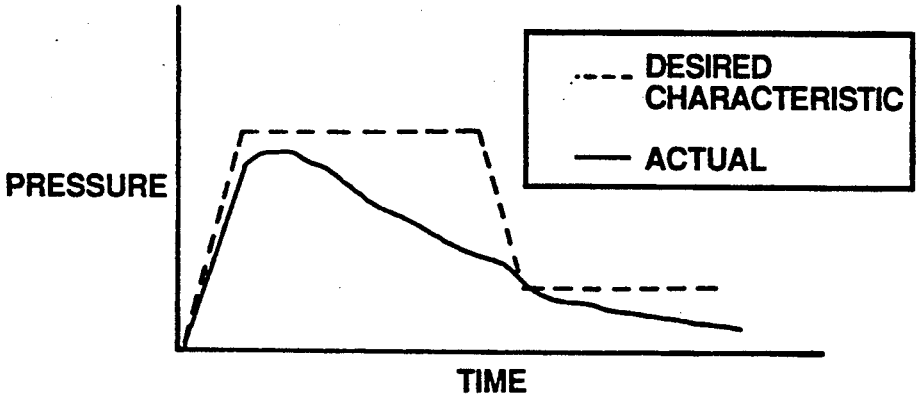
FIG. 2 sets forth the actual and the desired pressure/-time curves for a low impulse round, which show that to produce the desired pressure/time curve it is necessary for the servo valve to port hydraulic fluid out of the hydraulic cylinder initially to reduce the peak pressure.

To illustrate how the closed loop system operates, reference is made to FIG. 2, which shows the recoil pressure/time curve for low charge/zone rounds. Although the peak pressure for this round does not reach the maximum pressure for a full charge round, it does peak higher than necessary. Therefore, by reducing the peak pressure, the onset of fatigue failure in the weapon carriage can be delayed. In the pressure/time curve of FIG. 2 the servo valve would port fluid out of the hydraulic cylinder initially to reduce the peak pressure (via orifice $a_2$ and flowpath I, to the low pressure hydraulic fluid supply $P_0$).

Figure 3:
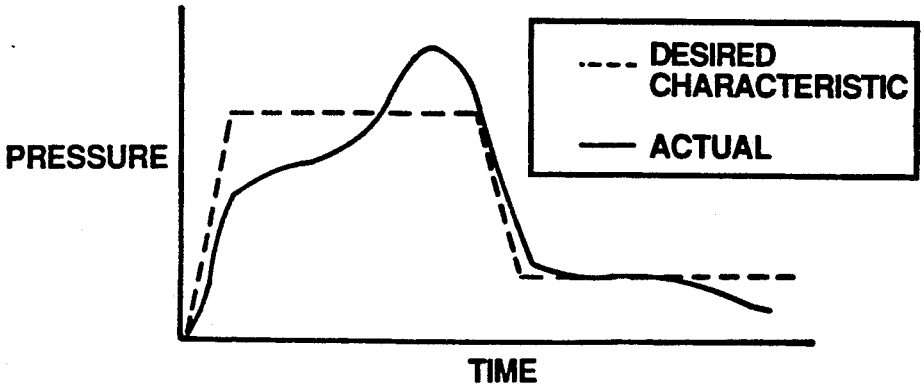
FIG. 3 sets forth the actual and the desired pressure/-time curves for a high impulse round, which show that it is necessary that the servo valve port hydraulic fluid from a high pressure supply into the hydraulic cylinder to raise the initial pressure in order to produce the desired pressure/time characteristics.

FIG. 3 shows a pressure/time curve, which has a low initial pressure followed by a greater than desired peak pressure, which would be harmful. In this case it would be necessary that the servo valve port hydraulic fluid from the high pressure reservoir $P_H$ into the hydraulic cylinder to raise the initial pressure. The additional fluid would be ported to the low pressure hydraulic fluid reservoir $P_0$ later in the cycle to keep the recoil distance unchanged.

In carrying out the present invention the data for the desired or optimum peak pressure (wherein the pressure/time curve has a trapezoidal shape) for each firing charge can be programmed into a microprocessor based controller. By sensing the initial velocity imparted to the recoiling parts the charge being fired can be identified and the microprocessor can select from the programmed data the desired peak pressure characteristics corresponding to the charge being fired. Any variation of the hydraulic pressure from the desired peak pressure during the recoil cycle would be sensed by a transducer, which would apply an appropriate control voltage via an amplifier to the servo valve to cause the valve to port hydraulic fluid into or out of the cylinder to control the pressure and thus achieve the desired peak or optimum pressure for the charge being fired.

What is claimed is:

1. A recoil system for weapons and devices employing hydraulic flow through an orifice for energy absorption, which comprises:

a housing defining a cylinder containing a hydraulic fluid, a piston slidably movable in said cylinder and having a head portion in sealed engagement with the cylinder and a stem portion connected to said weapon for absorbing recoil force, a first orifice in said cylinder having a flowpath to a low pressure hydraulic fluid supply, a second orifice in said cylinder having a flowpath to said low pressure hydraulic fluid supply, said flowpath containing a servo valve also having a flowpath to a high pressure hydraulic fluid supply, said servo valve being adapted to port hydraulic fluid out of said cylinder to said low pressure hydraulic fluid supply or into said cylinder from said high pressure hydraulic fluid supply through said second orifice, sensor means for measuring the initial velocity imparted to the recoiling parts by the impulse of the firing charge of the round, and controller means for calculating the desired peak pressure based on the initial velocity and available recoil distance, including transducer means for sensing any variation of hydraulic fluid pressure from the desired peak pressure during the recoil cycle and applying an appropriate voltage to the servo valve to port hydraulic fluid into or out of said cylinder through said second orifice to control the pressure in said cylinder to the desired peak pressure.

2. The recoil system according to claim 1, wherein the controller means includes a microprocessor, which is programmed with the desired peak pressure/time data for each firing charge, whereby the desired peak pressure/time curve corresponding to the charge being fired can be determined.

* * * * *